(12) United States Patent
Dee et al.

(10) Patent No.: US 6,500,310 B1
(45) Date of Patent: Dec. 31, 2002

(54) PROCESS FOR THE TREATMENT OF WASTE WATER

(75) Inventors: Robert Frank Dee, Amsterdam (NL); Marinus Van Zwienen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/719,624

(22) PCT Filed: Jun. 18, 1999

(86) PCT No.: PCT/EP99/04275
§ 371 (c)(1),
(2), (4) Date: Dec. 14, 2000

(87) PCT Pub. No.: WO99/67003
PCT Pub. Date: Dec. 29, 1999

(30) Foreign Application Priority Data

Jun. 23, 1998 (EP) .............................................. 98202085

(51) Int. Cl.$^7$ .............................. B01D 3/14; C02F 1/04; C07C 7/04
(52) U.S. Cl. ............................ 203/10; 203/75; 203/78; 203/12; 203/14; 585/800
(58) Field of Search ............................. 203/10, 78, 73, 203/74, 98, 75, 12, 14, DIG. 17, 100; 159/47.3; 202/158; 585/800

(56) References Cited

U.S. PATENT DOCUMENTS

| | | | | | |
|---|---|---|---|---|---|
| 5,675,055 | A | * | 10/1997 | Evans et al. | ................. 585/858 |
| 5,970,742 | A | * | 10/1999 | Agrawal et al. | ............... 62/630 |
| 6,106,674 | A | * | 8/2000 | Agrawal et al. | ............... 203/75 |
| 6,116,051 | A | * | 9/2000 | Agrawal et al. | ............... 62/630 |

FOREIGN PATENT DOCUMENTS

| | | | |
|---|---|---|---|
| EP | 542405 A1 | 9/1992 | ............... F25J/3/04 |
| GB | 2285226 | 5/1995 | ............ B01D/3/00 |

OTHER PUBLICATIONS

Fidkowski et al, "Minimum Energy Requirements of Thermally Coupled Distillation Systems", Aiche Journal, vol. 33, No. 4, Apr. 1987, pp. 643–653.*

Rudd, "Thermal Coupling for Energy Efficiency", Supplement to the Chemical Engineer, Aug. 27, 1992, pp. 14–15.*

Triantafyllou et al, "The Design and Optimisation of Fully Thermally Coupled Distillation Columns", Trans I Chem, vol. 70, Part A, Mar. 1992pp. 118–132.*

* cited by examiner

*Primary Examiner*—Virginia Manoharan
(74) *Attorney, Agent, or Firm*—Y. Grace Tsang

(57) ABSTRACT

A process for treating waste water streams containing at least hydrocarbons and salts to yield a clean water product, a concentrated brine product and a hydrocarbon-rich product, which process includes the steps of: (a) feeding the waste water feed into a first distillation column at a stage in the range of from 0.05 to 0.15 from the top, wherein n represents the total number of theoretical stages of the first distillation column and has a value in the range of from 20 to 40; (b) drawing off a vapor stream at a stage in the range of from 0.55 to 0.75 from the top and feeding this vapor stream into the bottom of a second distillation column having m theoretical stages, with m having a value in the range of from 3 to 10; (c) drawing off the clean water product as the top fraction from the second distillation column and drawing off a bottom stream from the second distillation column, which is fed back into the first distillation column below the draw off of the vapor stream in step (b) at a stage in the range of from 0.60 to 0.85 from the top; (d) drawing off the concentrated brine product as the bottom fraction of the first distillation column; and (e) drawing off the hydrocarbon stream as the top fraction of the first distillation column.

4 Claims, 1 Drawing Sheet

PROCESS FOR THE TREATMENT OF WASTE WATER

FIELD OF THE INVENTION

The present invention relates to a process for the treatment of waste water, in particular waste water from industrial processes containing at least hydrocarbons and salts.

BACKGROUND OF THE INVENTION

The treatment or purification of waste water originating from industrial processes and containing at least hydrocarbons and salts (organic and/or inorganic) normally is a relatively expensive procedure. Environmental legislation nowadays puts stringent demands on the purification or waste water streams from industrial processes, particularly when the purified waste water is to be released into the environment. Accordingly, the choice of a purification method for industrial waste water is bound by practical, environmental and economic considerations.

One industrial process, wherein a relatively large amount of waste water is produced is the styrene monomer/propylene oxide (SM/PO) production process. In general such SM/PO process involves the steps of: (i) reacting ethylbenzene with oxygen or air to form ethylbenzene hydroperoxide, (ii) reacting the ethylbenzene hydroperoxide thus obtained with propene in the presence of an epoxidation catalyst to yield propylene oxide and 1-phenyl ethanol, and (iii) converting the 1-phenyl ethanol into styrene by dehydration using a suitable dehydration catalyst. In the last step water is produced. In addition to this reaction water organic by-products such as aliphatic and aromatic hydrocarbons, aldehydes, ketones, alcohols, phenols and organic acids are produced. The by-products are separated from the main products with the aid of clean water and the organic acids are neutralized using a basic aqueous solution, such as an aqueous sodium (bi)carbonate and/or sodium hydroxide solution. Furthermore, additional water is introduced with the air in the step (i) and as steam in step (iii) of the above process.

The waste water from an SM/PO production plant typically contains a total of from 1.0 to 3.5 wt % of non-salt organic compounds and from 3.0 to 6.0 wt % of organic salts. It may further contain up to 2.0 wt % of sodium carbonate and sodium bicarbonate and/or traces of sodium hydroxide, depending on the basic solution used in the neutralization of organic acids.

The input of clean water to an SM/PO plant can be up to tens of thousands kg per hour, while the output of waste water is normally about 50% higher than the imput of clean water. The waste water cannot be discharged without additional purification treatment. As has already been indicated above, however, the choice of a suitable purification treatment is limited due to all sorts of practical, environmental and economic considerations.

In GB-A-2,252,052 further information is given about prior art methods for treating waste water and about typical compositions of SM/PO waste water streams. The purification process disclosed in GB-A-2,252,052 involves freeze-concentration combined with salts-removal, whereby the waste water is separated into an at least two-fold concentrated waste product, salt crystals and a substantially pure water product.

The method disclosed in GB-A-2,252,052, however, still leaves room for improvement. Particularly the economics of a freeze concentration process are still not satisfactorily. Capital investment required for a freeze concentration process at present account for at least 10% of the total capital investment necessary for an SM/PO plant. It would thus be beneficial if a cheaper, but at least equally good—in terms of purification—alternative waste water purification treatment could be developed. Thus, it is an important object of the present invention to develop such alternative. A further object is to develop a waste water treatment which produces a clean water stream, which meets all requirements for discharge into the environment.

It has been found in accordance with the present invention that by applying a specific distillative treatment a very effective purification of the waste water is accomplished at reduced cost.

BRIEF SUMMARY OF THE INVENTION

Accordingly, the present invention relates to a process for treating of waste water streams containing at least hydrocarbons and salts to yield a clean water product, a concentrated brine product and a hydrocarbon-rich product, which process comprises the steps of:

(a) feeding the waste water feed into a first distillation column at a stage in the range of from $0.05*n$ to $0.15*n$ from the top, wherein n represents the total number of theoretical stages of the first distillation column and has a value in the range of from 20 to 40;

(b) drawing off a vapour stream at a stage in the range of from $0.55*n$ to $0.75*n$ from the top and feeding this vapour stream into the bottom of a second distillation column having m theoretical stages, with m having a value in the range of from 3 to 10;

(c) drawing off the clean water product as the top fraction from the second distillation column and drawing off a bottom stream from the second distillation column, which is fed back into the first distillation column below the draw off of the vapour stream in step (b) at a stage in the range of from $0.60*n$ to $0.85*n$ from the top;

(d) drawing off the concentrated brine product as the bottom fraction of the first distillation column; and (e) drawing off the hydrocarbon stream as the top fraction of the first distillation column.

DETAILED DESCRIPTION OF THE INVENTION

Figure 1:
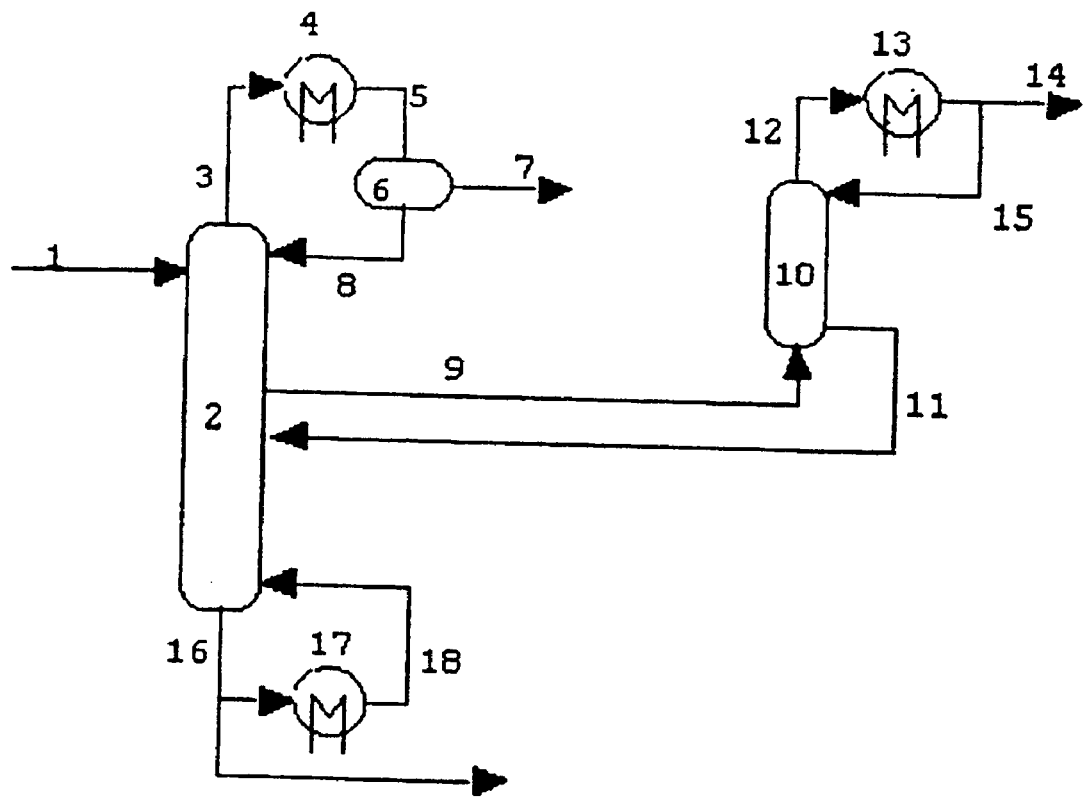
FIG. 1 shows an illustrative embodiment of the present invention.

The above process has many advantages. First of all, it is highly cost effective. Capital investment required for the above purification treatment is at least 10% lower, but may be as high as 50% lower than for the freeze concentration process disclosed in GB-A-2,252,052. Furthermore, from the viewpoint of purification it also performs excellent. The clean water obtained meets all specifications in terms of Chemical Oxygen Demand (COD) and harmful components for direct discharge into the environment. As is well known in the art, COD is a measure for the quantity of contaminating components in a process stream, more particularly for the amount of oxygen necessary to oxidise (and hence degrade) the contaminating components present in a process stream. COD is typically expressed in milligrams of oxygen per litre of process stream. As a rule a purified waste water stream should have a COD of at most 100 mg/l before it can be discharged into the environment. Harmful components mainly are phenolic components like phenol and phenolates. Typically, such components must be present in a purified process stream in an amount of less than 50 ppm before it is allowed to discharge this stream into the environment. The hydrocarbon-rich product obtained is very suitable as fuel or can be re-used in the process from which the waste water stream originates. The concentrated brine product can be incinerated in conventional incineration installations.

The waste water stream to be treated by the process according to the present invention should at least contain hydrocarbons and salts. Any industrial process yielding such type of waste water could benefit from the purification process according to the present invention. It has, however, been found particular advantageous to treat waste water streams originating from a styrene monomer/propylene oxide production plant. Such waste water streams typically comprise hydrocarbons, aldehydes, ketones, alcohols, phenols and salts.

The first distillation column has from 20 to 40 theoretical stages. Preferably, the number of theoretical stages (n) of the first distillation column is in the range of from 25 to 35. The number of actual trays to be used in the distillation column can be easily determined on the basis of the efficiency of the trays used and the number of theoretical stages. In step (a) of the process, the waste water stream enters the first distillation column at a stage which is $0.05*n$ to $0.15*n$ from the top. Preferably the waste water enters the column right below the top at the second, third, fourth or fifth stage from the top.

In step (b), subsequently, a vapour stream is drawn off at a stage in the range of from $0.55*n$ to $0.75*n$, preferably from $0.60*n$ to $0.70*n$, from the top. The vapour stream is fed into the bottom of a second distillation column having m theoretical stages, with m having a value in the range of from 3 to 10. The preferred number of theoretical stages of this second distillation column is 3 to 7.

In step (c) the clean water product is withdrawn from the second distillation column as the top fraction. The bottom stream from this second distillation column is fed back into the first distillation column below the draw off of the vapour stream in step (b) at a stage in the range of from $0.60*n$ to $0.85*n$, preferably from $0.65*n$ to $0.75*n$, from the top. Accordingly, it is preferred that steps (b) and (c) be operated such that the vapour stream: is drawn off in step (b) at a stage in the range of from $0.60*n$ to $0.70*n$ and that the bottom stream from the second distillation is fed back into the first distillation column in step (c) at a stage in the range of from $0.65*n$ to $0.75*n$ from the top.

The distillation treatments in the first and/or the second distillation may be carried out under atmospheric pressure or under reduced pressure. It is, however, preferred to operate both distillation columns under atmospheric conditions.

Each distillation column suitably has at least one reboil duty and a condensing duty to increase the separation efficiency. As regards the first distillation column, the temperature regime must be such that the vapour stream, mainly consisting of water, can be withdrawn at a stage in the range of from $0.55*n$ to $0.75*n$ from the top. This implies that the temperature in the first distillation column should be at least 100° C. Since in the second distillation column the clean water stream is recovered as the top fraction, the temperature in this distillation column should also be at least 100° C. In practice, it has been found that both columns are suitably operated under atmospheric conditions at a temperature of from 100° C. to 110° C. By operating under these conditions the reboil duty in the first distillation column can be provided by low level heat, which could be low pressure steam or waste heat from the industrial process from which the waste water stream originates. The waste water entering the first distillation column suitably has a temperature in the range of from 50 to 110° C., more suitably 65 to 90° C.

FIG. 1 shows an illustrative embodiment of the present invention.

Waste water stream 1 enters the first distillation column 2. Top fraction 3 is passed through heat exchanger 4 and the resulting at least partly condensed stream 5 is separated in phase separator 6 into hydrocarbon-rich stream 7 and a stream 8 containing a major proportion of water, the latter stream being fed back into the first distillation column 2. Hydrocarbon-rich stream 7 can, for instance, be used as fuel. Water-rich vapour stream 9 is withdrawn from the first distillation column 2 and passed into the bottom of second distillation column 10. Top fraction 12 is passed through heat exchanger 13 and the resulting cooled stream 14 is the clean water stream, part of which (stream 15) is re-introduced into the top part of second distillation column 10. The bottom fraction 11 of second distillation column 10 is led back to first distillation column 2 and enters this column below the vapour draw off 9. Part of the bottom stream 16 of first distillation column 2 is recovered as concentrated brine product, while the remaining part is passed through reboiler 17 after which the resulting stream 18 is re-introduced into the bottom part of first distillation column 2.

Not shown in FIG. 1, but also possible is that part of condensed stream 5 is led back into distillation column 2 and part is recovered as a hydrocarbon/water-containing bleed stream for e.g. fuel purposes. In that case phase separator 6 can be dispensed with.

What is claimed is:

1. A process for treatment of a waste water feed stream originating from the production of styrene monomer and propylene oxide and containing at least hydrocarbons and salts to yield a clean water product, a concentrated brine product and a hydrocarbon-rich product, which process comprises the steps of:

(a) feeding the waste water feed stream into a first distillation column at a stage in the range of from 0.05n to 0.15n from the top, wherein n represents the total number of theoretical stages of the first distillation column and has a value in the range of from 20 to 40;

(b) drawing off a vapor stream at a stage in the range of from 0.55n to 0.75n from the top and feeding said vapor stream into the bottom of a second distillation column having m theoretical stages, with m having a value in the range of from 3 to 10;

(c) drawing off the clean water product as the top fraction from the second distillation column and drawing off a bottom stream from the second distillation column, which is fed back into the first distillation column below the draw off of the vapor stream in step (b) at a stage in the range of from 0.60n to 0.85n from the top;

(d) drawing off the concentrated brine product as the bottom fraction of the first distillation column; and (e) drawing off the hydrocarbon-rich product as the top fraction of the first distillation column.

2. A process according to claim 1, wherein n has a value in the range of from 25 to 35.

3. A process according to claim 1, wherein the vapor stream is drawn off in step (b) at a stage in the range of from 0.60n to 0.70n and the bottom stream from the second distillation is fed back into the first distillation column in step (c) at a stage in the range of from 0.65n to 0.75n from the top.

4. A process according to claim 1, wherein m has a value in the range of from 3 to 7.

* * * * *